Nov. 19, 1940.  L. R. McLEOD  2,222,369
CHICKEN FEEDER
Filed July 26, 1938
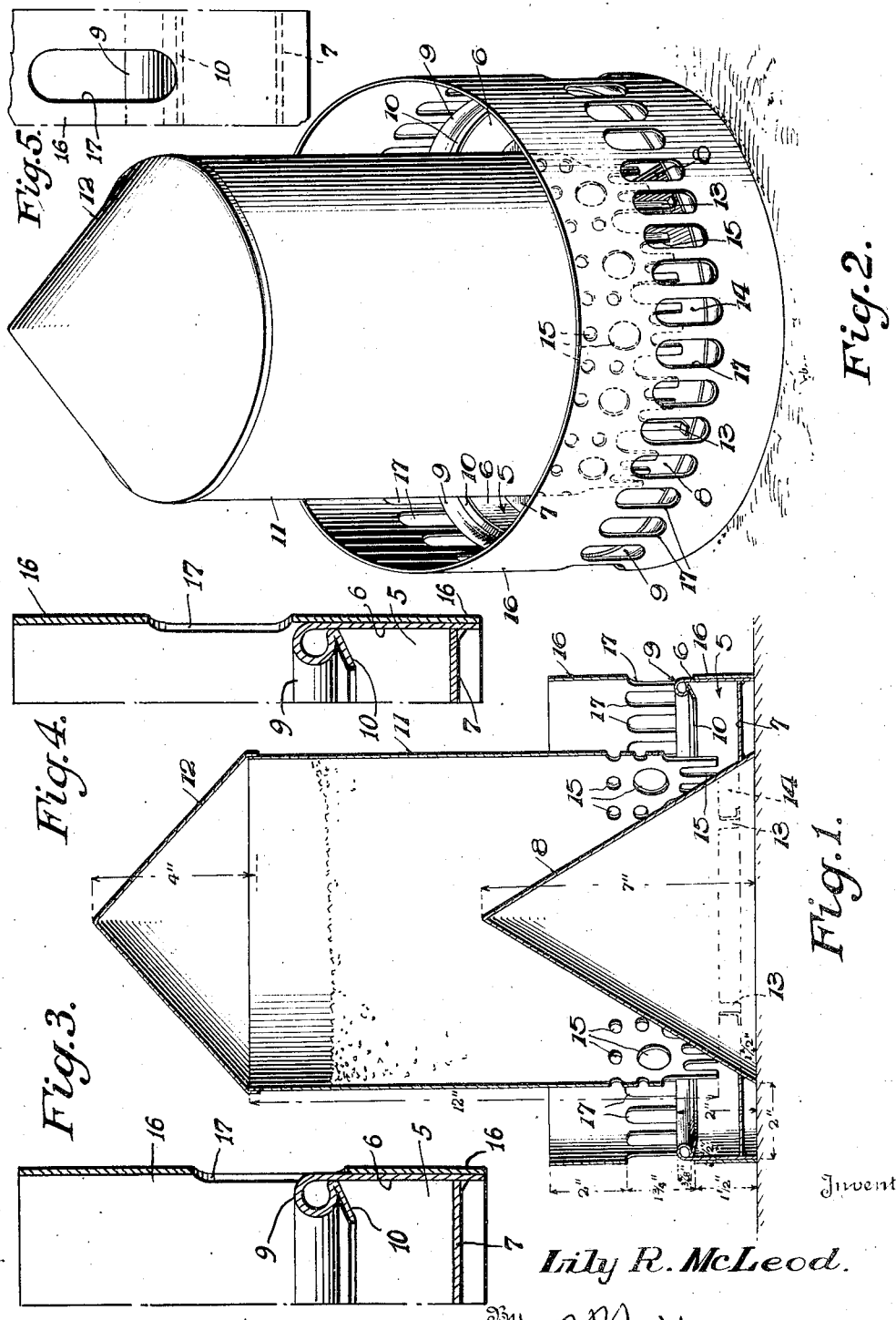
Inventor
Lily R. McLeod.

Patented Nov. 19, 1940

2,222,369

UNITED STATES PATENT OFFICE 2,222,369

CHICKEN FEEDER

Lily R. McLeod, Walterboro, S. C.

Application July 26, 1938, Serial No. 221,411

1 Claim. (Cl. 119—52)

My invention relates to chicken feeders.

An important object of the invention is to provide a device of the above mentioned character which is primarily adapted as a feeder for baby chicks from one day to six weeks old.

A further object of the invention is to provide a feeder of the above mentioned character which is sanitary, economical in time and labor and will conserve the feed by preventing the chicks from wasting the same.

A further object of the invention is to provide a feeder of the above mentioned character which is extremely simple in construction and cheap to manufacture, and formed in few parts which are readily separable for the purpose of cleaning.

A further object of the invention is to provide a feeder of the above mentioned character which will promote comfort to baby chicks, while eating.

Other objects and advantages of the invention will be apparent during the course of the following description.

In the accompanying drawing forming a part of this application and in which like numerals are employed to designate like parts throughout the same, Figure 1 is a central vertical longitudinal section through a feeder embodying my invention, Figure 2 is a perspective view of the same, Figure 3 is an enlarged vertical section through the guard and associated elements, parts broken away, Figure 4 is a similar view with the guard inverted, and, Figure 5 is an elevation of the guard as shown in Figure 3, parts broken away.

In the drawing, wherein for the purpose of illustration is shown a preferred embodiment of my invention, the numeral 5 designates a feed pan, comprising a preferably cylindrical portion 6, preferably having a height of two inches. The feed pan 5 includes a bottom 7, preferably raised one-half inch from the lower end of the cylindrical portion 6. The bottom 7 may be rigidly attached to the cylindrical portion 6 by any suitable means, or these parts may be formed integral, if desired. Disposed within the cylindrical portion 6, in spaced concentric relation thereto, is a conical spreader 8, increasing in diameter downwardly, and rigidly attached to the bottom 7 by any suitable means, or formed integral therewith, if desired. The material of the cylindrical portion 6, at its upper end, is rolled inwardly, providing a hollow bead 9, from which projects an inwardly facing flange 10, inclined downwardly toward the spreading cone 8, as shown. The inclined flange 10 extends downwardly toward its inner end, and its high edge is carried by the lower portion of the bead 9, and this high edge is therefore dropped below the upper surface of the bead 9. This forms a generally triangular recess A above the flange 10 to accommodate the lower curved jaw or portion of the head of the chicken. If the material of the feed pan 6 at its top were bent straight down to a point at the inner edge of the flange 10, the triangular space A would be lost and the chicken's head would be supported at a much higher elevation, making the reach longer and rendering it more inconvenient for the chicken to eat. It is preferred that the cylindrical portion 6 is of such a height that the top of the hollow bead 9 will be two inches above the lower end of the cylindrical portion 6. This is because the feeder is used in connection with baby chicks from one day to six weeks old. If the bead 9 were arranged at an elevation above two inches from the floor or other support, the baby chicks could not easily reach the feed while standing upon the floor, and if the bead 9 were lower, it might induce the chicks to stand with one foot on the floor and the other foot on the bead 9, with the result that the feeder would have to be washed. However, the construction causes the baby chick to stand with both feet upon the floor and put its head over the bead 9, which is two inches above the floor, and it could not comfortably reach its head down a full two inches upon the inner side of the feed pan, particularly when the feed is low, and hence the bottom 7 of the feed pan is elevated one-half inch. The flange 10 is an important feature of the invention. It serves to keep the fluff on the chick's neck out of the feed and it also serves as an additional protection against the waste of the mash when the chick flips the feed from one side to the other. It will also prevent the spilling of the feed if too much of the same is fed to one side of the pan.

Surrounding the spreading cone 8 is a preferably cylindrical hopper 11, arranged within the feed pan 5 in spaced concentric relation to the cylindrical portion 6. This hopper receives the mash or feed and its top is preferably covered by a removable lid 12, shown as conical, so that it is roost proof. At its lower end, this hopper has spaced legs 13, adapted to rest upon the bottom 7, thereby holding the lower end of the hopper 11 spaced from this bottom, affording a feed passage 14. The lower portion of the hopper 11 is provided with openings 15, and the chicks pick the feed through these openings, aiding in the downward feeding movement of the feed. The hopper 11 is supported by the legs 13, when placed in position, and these legs are ordinarily free from connection with the bottom 7, to permit of the free separation of the hopper 11 from the feed pan 5, but the legs 13 may be attached to the bottom 7, if desired. I have found that satisfactory results are obtained by having the cylindrical portion 6 spaced from the hopper 11 for a distance of one and seven-eighths inches, particularly when the baby chicks are young.

Surrounding the feed pan 5 and associated elements is a preferably cylindrical perpendicular guard 16, preferably having a height of five and one-fourth inches. This guard is adapted to be slipped over or about the feed pan 5 and is free from attachment thereto so that it may be readily separated from the fed pan but is held in position by the feed pan. The guard 16 has an annular set of spaced elongated vertical openings 17. Each opening preferably has a vertical dimension of one and three-fourths inches, and the lower end of the opening is spaced from the bottom of the guard for a distance of one and one-half inches, while its upper end is spaced from the top of the guard for a distance of two inches.

In the use of the feeder, when the chicks are young, the guard 16 is placed about the feed pan 5 so that the lower ends of the openings 17 are arranged at the minimum distance from the bottom of the pan 5, as shown in Figures 1 and 2. When the guard 16 is in the position shown in Figures 1 and 2, the vertical dimensions of the openings 17 are shortened, since the upper portion of the feed pan 6 extends across the lower portions of the openings 17. This will reduce the size of the openings 17 so that the very young chicks cannot pass through these openings and enter the feed pan. The feed is held within the hopper, and passes downwardly about the spreading cone 8, to enter the feeding pan 5. The baby chick, with both feet resting upon the floor, passes its head through the opening 17, and about the rim or bead 9 and then downwardly over the flange 10, to eat the mash. The chick may also pick the mash through the openings 15. As the chicks grow older, and taller, the guard 16 is removed and inverted, and again applied to the feed pan. The upper ends of the openings 17 will therefore be arranged at an increased elevation from the rim or bead 9, and the lower ends of the openings 17 will be at substantially the elevation of the upper surface of the bead 9, whereby substantially the entire vertical dimensions of the openings 17 are uncovered and whereby the larger chick may more conveniently eat from the feed pan. These larger chicks cannot now pass through the substantially completely uncovered openings 17. An important feature of the guard 16 is that its top is entirely open, thereby affording the maximum light upon the feed within the feed pan. When the chicks reach the age of two or three weeks, the guard 16 is removed, and the feeder used without the same.

I contemplate forming the various parts of my feeder of sheet metal, cardboard or any other suitable material. While it is preferred to make the various parts of the device in the dimensions recited, particularly when it is used to feed baby chicks, yet the invention is not restricted to these dimensions as the feeder may be made in larger sizes, to feed older chicks or completely grown chickens or other poultry.

It is to be understood that the form of my invention herewith shown and described is to be taken as a preferred example of the same and that various changes in the shape, size and arrangement of parts may be resorted to without departing from the spirit of my invention or the scope of the subjoined claim.

Having thus described my invention, I claim:

A feeder for baby chicks or the like, comprising a feed pan open at its top and having an upstanding side portion, a tubular guard removably mounted upon the upstanding side portion, said tubular guard having both ends open, said guard having a horizontal set of vertically elongated openings, the openings being nearer one end of the guard, the arrangement being such that when that end of the guard having the openings nearer it is arranged upon the upstanding portion and moved to the lowermost position with relation thereto, the upper end of the upstanding portion covers the lower portions of the openings to reduce their length so that the baby chicks cannot pass through the reduced openings, and when the guard is inverted and mounted upon the upstanding portion and moved to the lowermost position with relation thereto, the lower ends of the openings are uncovered by the upper end of the upstanding portion so that the openings are substantially uncovered throughout the entire length to increase their effective length, a hopper arranged within the fed pan, and a spreading element arranged within the hopper.

LILY R. McLEOD.